United States Patent [19]

Yodoshi

[11] Patent Number: 5,201,619
[45] Date of Patent: Apr. 13, 1993

[54] TAPERED SLOT END MILL

[75] Inventor: Shigeyasu Yodoshi, Osaka, Japan

[73] Assignee: Hitachi Tool Kabushiki Kaisha, Tokyo, Japan

[21] Appl. No.: 826,248

[22] Filed: Jan. 27, 1992

Related U.S. Application Data

[63] Continuation of Ser. No. 549,542, Jul. 9, 1990, abandoned, which is a continuation of Ser. No. 365,558, Jun. 13, 1989, abandoned.

[30] Foreign Application Priority Data

Jun. 14, 1988 [JP] Japan .................. 63-79631[U]

[51] Int. Cl.$^5$ .......................... B23C 3/30; B23C 5/04
[52] U.S. Cl. .................................. 409/132; 407/54; 407/57; 407/63
[58] Field of Search ............... 407/34, 42, 53, 54, 407/57–63; 409/132

[56] References Cited

U.S. PATENT DOCUMENTS

| | | | |
|---|---|---|---|
| 2,113,178 | 4/1938 | Gase | 407/63 |
| 2,377,329 | 6/1945 | Dettmer | 407/53 |
| 3,078,546 | 2/1963 | Kiernan | 407/53 X |
| 3,736,634 | 6/1973 | Sonnie | 407/54 |
| 3,811,163 | 5/1974 | Frederick et al. | 409/132 X |
| 3,863,316 | 2/1975 | Yeo | 407/54 |
| 4,093,392 | 6/1978 | Hopkins | 407/59 |
| 4,227,837 | 10/1980 | Yodoshi | 407/53 |
| 4,274,771 | 6/1981 | Nishimura | 407/53 |
| 4,572,714 | 2/1986 | Suzuki | 407/54 |
| 4,712,948 | 12/1987 | Kidani | 407/54 |

FOREIGN PATENT DOCUMENTS 161615 10/1988 Japan .

*Primary Examiner*—Steven C. Bishop
*Attorney, Agent, or Firm*—Koda and Androlia

[57] ABSTRACT

A tapered slot end mill comprising a shank and a tapered section having a polygonal shape and disposed at the end of the shank, the tapered section being adapted such that the edge formed at each vertex of the polygonal shape along the axis of the end mill is tapered to have a smaller diameter at the end of the end mill and has a helix form, a pair of end cutting edges formed symmetrically at the ends of the edges, with a part of the edge included in the end cutting edge, and a pair of peripheral cutting edges are respectively provided adjacent to the end cutting edges via rake angle surfaces, and the end mill being characterized in that the helix is formed in the direction opposite to the rotating direction of the end mill.

12 Claims, 3 Drawing Sheets (A)    (B)

| THE INVENTION (LEFT HAND HELIX EDGE) | PRIOR INVENTION (RIGHT HAND HELIX EDGE) |
|---|---|
| 19.99 mm | 17.60 mm |
| | 5 μm ↕ |

TAPERED SLOT END MILL

BACKGROUND OF THE INVENTION

1. Field of the Invention

This is a continuation of application Ser. No. 549,542, filed Jul. 9, 1990 now abandoned, which is a continuation of application Ser. No. 365,558, filed Jun. 13, 1989, now abandoned. The present invention relates to a tapered end mill for machining or cutting rib slots or tapered slots in metal molds for casting rib section in resin products or die cast metal products.

2. Prior Art

It is well known that electrical discharge machining or cutting is generally used to cut tapered slots (rib slots) for casting rib section in resin products or die casting metal products.

Electrical discharge machining uses an electrode having a shape corresponding to a rib slot of a metal mold and thus requires many processes: electrode forming, electrical discharging and polishing processes. These processes also require corresponding processing machines. Despite these problems, electrical discharge machining is frequently used for cutting deep rib slots (with a high ratio of depth to width) or when rib slots cannot be cut using a cutting tool due to limitations in the slot shape.

When cutting a rib slot using a cutting tool, as shown in FIG. 9, a generally-used square end mill cuts a rectangular cross-sectional slot section 2 which extends from the top 6 to the bottom 7 of the slot by repeating a cutting stroke in the longitudinal direction of the slot. Then a tapered end mill B having helix edges $b_2$ at its tapered section $b_1$ as shown in FIG. 8 is used to remove tapered sections 3. In the cross-sectional shape of a rib slot, the depth 5 of the slot is far greater than (five times or more) the width 4 of the slot. If the entire rib slot is cut by one process, the end mill must be extended further and the amount of cutting chips increases. The stiffness of the end mill reduces and cutting is impossible. Therefore, even when a single machine can be used for cutting unlike electrical discharge machining, costs for cutting tools are high and cutting efficiency is low.

A tapered end mill A with a polygonal cross-section shown in FIG. 7 is used to efficiently cut rib slots. More particularly, the tapered end mill(a) has a regular polygonal shape in the cross section perpendicular to the axis of the end mill at the tapered section $a_1$. Each edge $a_2$ is formed at the corresponding vertex of the regular polygonal shape along the axis and has a helix form. The edge is also formed along the imaginary tapered cylindrical surface which circumscribes the regular polygon. In addition, end cutting edges $a_3$ and peripheral cutting edges $a_4$ are formed at the smaller end of the tapered section $a_1$. With this tapered end mill (a), the cross-sectional area of the regular polygonal tapered section $a_1$ connected to the edge section at the smaller end is larger than that of an ordinary end mill. Therefore, the end mill is superior in stiffness and is less deformed by cutting force. Furthermore, each edge of the regular polygon functions as a wiper and provides a burnishing effect. These features eliminate the need for the preliminary process of cutting the above-mentioned rectangular section. With this single end mill, both the cutting and burnishing processes can be done simultaneously and quickly. When cutting a deep slot (such as a rib slot with a high ratio of depth to width), the tool requires large stiffness and superior cutting performance. Countermeasures should also be taken to reduce deflection during cutting and to maintain high cutting accuracy. An ordinary slot end mill has right hand helix edges to provide superior cutting performance and to discharge chips upward from the end cutting edge. In the case of the above-mentioned end mill with a polygonal cross section, its helix angle becomes smaller due to cutting force during cutting and self-excited vibration occurs sometimes in the direction of cutting into the bottom of the slot. This results in unstable cutting performance and breakage of the end mill.

To solve these problems, the tapered section of an end mill provided with a regular polygonal cross section and right hand helix edges is found in Japanese Utility Model Publication No. 63-161615 (applied by the same assignor as that of this patent application). Since this end mill has a polygonal cross section, its stiffness, to which cutting performance is dependent on, is greater than that of a conventional end mill equipped with two cutting edges.

However, since the end mill of the prior application has right hand helix edges and starts cutting at the smaller end of the cutting edge, its cutting performance is not stable. The finished surface is rough and the cutting depth is smaller as clearly shown in Table 1 and FIG. 10 (comparison).

SUMMARY OF THE INVENTION

Accordingly, it is an object of the present invention to provide a superior tapered rib slot end mill used in the cutting technology field of the metal mold industry by improving the cutting performance and efficiency of the above-mentioned regular polygonal end mill.

To achieve the objects of the present invention and solve the above-mentioned problems, the end mill of the present invention has left hand helix edges (opposite to the rotating direction of the end mill) formed by the sides of the polygonal section along the tool axis in order to stabilize the direction of cutting force.

With a preferred embodiment of the present invention, the forms of the tapered edges are changed along the axis so that rib slots with curved surfaces can be cut.

With another preferred embodiment of the present invention, the tapered inner surfaces forming the edges are middle-low concave surfaces. The angle between the tapered inner surfaces is thus made smaller and the wiper function of the edges is intensified.

The structure of the present invention is explained below referring to the accompanying drawings.

DETAILED DESCRIPTION OF THE INVENTION

Figure 1:
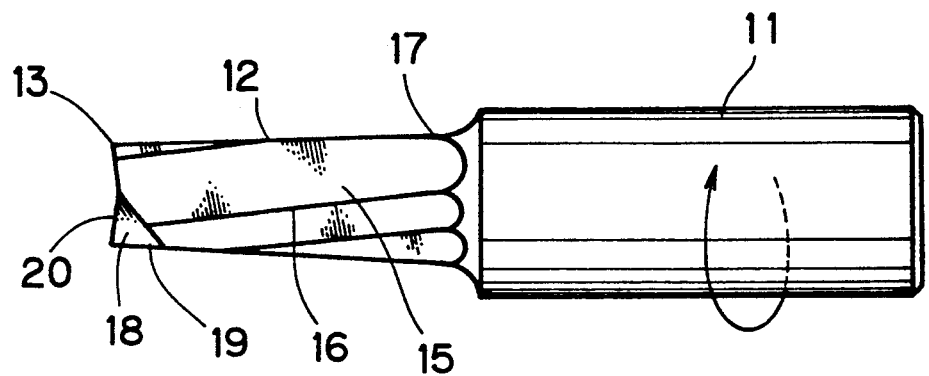
FIG. 1 is a front view illustrating an embodiment of the present invention.
Figure 2:
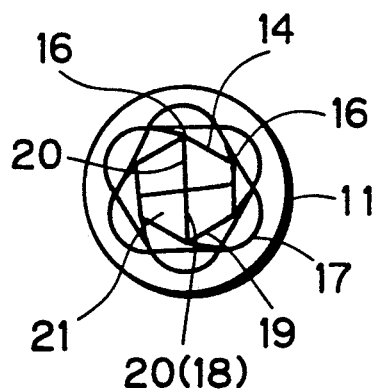
FIG. 2 is a bottom view of the embodiment shown in FIG. 1.
Figure 3:
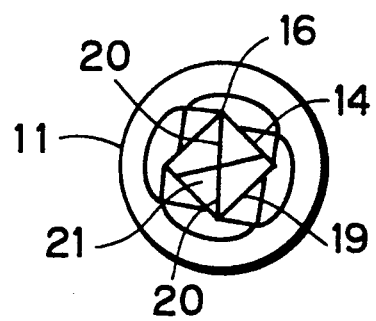
FIGS. 3, 4 and 5 are bottom views of another embodiments of the present invention.

FIGS. 1 and 2 shows an embodiment of the present invention, a tapered end mill with a hexagonal cross section. FIG. 3 shows a tapered end mill with a square cross section. Referring to FIGS. 1 and 2, numeral 11 represents a shank which is removably installed into the spindle of a rotating cutting machine via a chuck and rotated around its axis in the direction indicated by the arrow. A tapered section 12 is provided at the end of the shank 11. The cross-sectional area of the tapered section 12 gradually increases along its length from the smaller end 13 to the shank 11. The cross section of the tapered section is a regular polygon, for example a hexagon as shown in FIGS. 1 and 2. The tapered surface 15 formed by each side 14 of the polygon is twisted left in a tapered helix form as viewed from the smaller end 13 to the shank. The edge 16 of the end mill is formed along the tapered cylindrical surface formed between the circumscribed circle of the smaller end 13 and that of the taper ending section 17 on the shank side. A rake surface 18 is formed at the smaller end 13. At the intersection of the rake surface 18 and the tapered section 12, a peripheral edge 19 is formed to cut side walls. The length of the peripheral edge 19 should be equal to the diameter of the smaller end to obtain sufficient stiffness. At the intersection of the rake surface 18 and the smaller end 13, an end cutting edge 20 is formed toward the center of the axis. A relief surface 21 of the end cutting edge is also provided at the smaller end.

The tapered rib slot end mill of the present invention, having the above-mentioned structure, is installed into the end of the spindle of a rotating cutting machine (not shown) via a chuck. The depth of cut for one cutting stroke from the top of work should not be greater than the length of the peripheral cutting edge 19. The end mill is moved perpendicular to its axis to cut a slot. When another depth of cut is provided and the tool is further moved after the bottom of the slot is cut, the peripheral cutting edge 19 performs cutting and the tapered polygonal helix edge 16 forcibly widens the slot walls and provides a burnishing effect to form a smooth tapered inner surface 1. By repeating this movement step by step until the desired depth is reached, both the cutting and burnishing processes can be done simultaneously and efficiently using a single tool.

The polygonal edge 16 of the tapered section 12 makes a smooth contact with the cut slot walls when the edge forcibly opens the walls since the edge is twisted left in a helix form. As a result, vibration is reduced and the tapered inner surface 1 is formed properly. The edge is twisted left only for the reason below. If twisted right, the polygonal edge cuts into the slot wall after the cutting load of the cutted edge is applied so that cutting begins under an unstable condition. As a result, the twist angle is reduced and self-excited vibration is apt to occur. To the contrary, in the case of the left hand twisting, the edge first contacts the slot walls and held between the walls when cutting begins. As a result, cutting can begin stably and smoothly and the obtained surface roughness is superior.

Figures 9, 10:
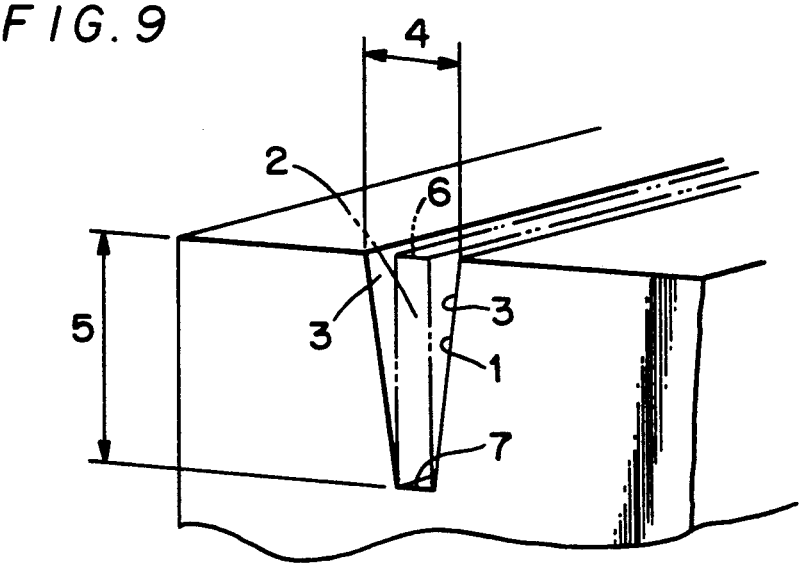
FIG. 9 is a perspective segmentary view illustrating a basic rib slot to explain the present invention and FIG. 10 compares the shape, depth and surface roughness of a rib slot cut by the polygonal tapered end mill with left hand helix cut edges of the present invention and those of a rib slot cut by the tapered end mill with right hand helix cut edges of the prior application. The left column in FIG. 10 illustrates the results of the present invention and the right column illustrates the results of the prior application.

Referring to FIG. 10, the tapered end mill of the present invention, which has a tapered section with left hand helix edges, is compared with the tapered end mill of the prior application, which has a tapered section with right hand helix edges. Both have a square cross section. More specifically, the shape, depth and surface roughness of a rib slot cut by the former end mill are compared with those of a rib slot cut by the latter. The cutting conditions are shown in Table 1.

TABLE 1

| Tapered end mill | Diameter: | 1 |
| --- | --- | --- |
|  | Half angle of taper: | 1°30' |
| Work material | S55C |  |
| Cutting conditions | Rotating speed: | 13,000 rpm |
|  | Feed rate: | 400 mm/min |
|  | Depth of cut: | 0.02 mm/stroke |

According to the results shown in FIG. 10, the end mill with left hand helix edges can cut deeper slots than the end mill with right hand helix edges. The surface roughness of the slot surface obtained by the former is far superior to that obtained by the latter. It is, therefore, obvious that the end mill of the present invention is ideally suited for cutting rib slots.

Figure 4:
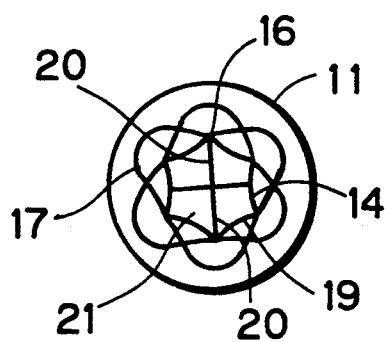
Figure 5:
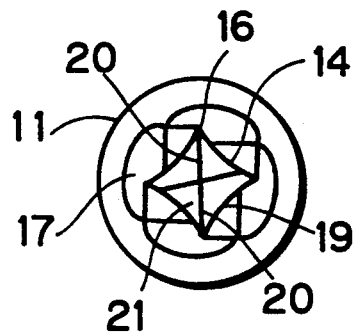
Figure 6:
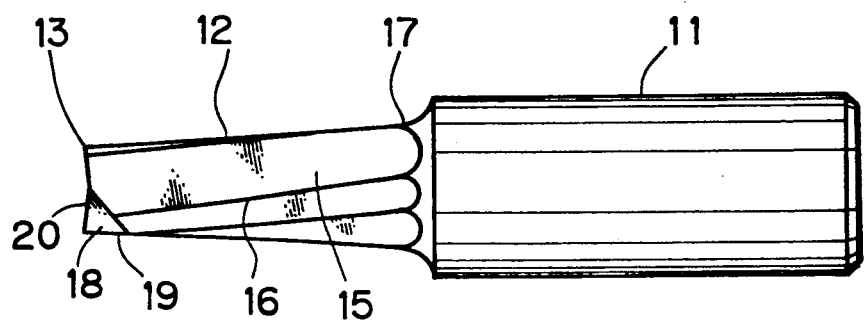
FIG. 6 is a front view of a still another embodiment of the present invention, FIG. 7 (A) is a front view of a conventional tapered end mill with a polygonal cross section, FIG. 7 (B) is a side view of the end mill shown in FIG. 7 (A)
Figure 7:
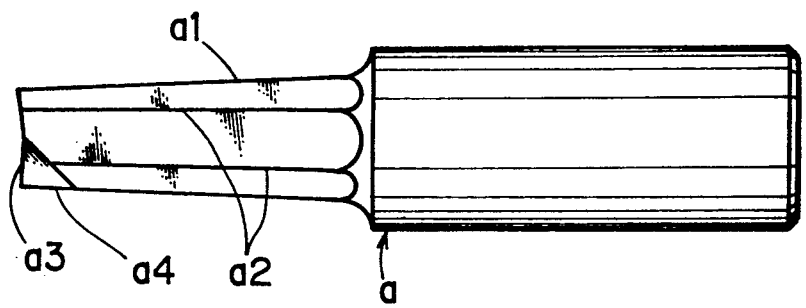
Figure 7:
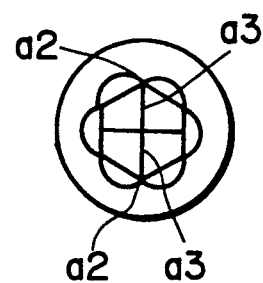
Figure 8:
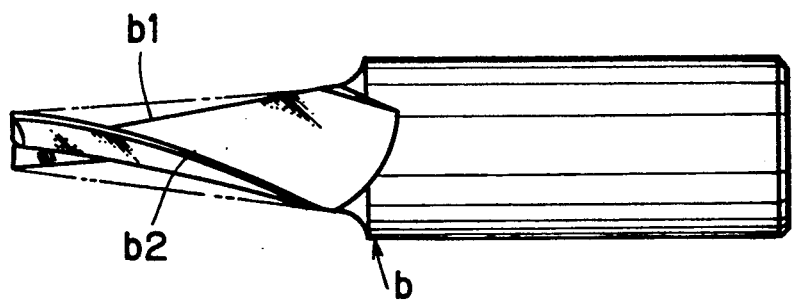
FIG. 8 is a front view of a conventional tapered end mill with two cutting edges.

In the process of widening the slot walls using the edges to burnish the slot walls, the load increases as the taper angle is larger. To reduce the load, the sides of the polygon should be concaved as shown in FIGS. 4 and 5. This decreases the edge angle and increases the rake angle (reduce the rake angle in the negative direction).

Producing conventional tapered end mills requires special skill and it is thus difficult to obtain desired shapes. In the case of the present invention, even a tapered end mill capable of cutting a slot with different taper angles (the taper angle at the top differs from that at the bottom) can be produced by simply changing the taper angle of the polygon edges. It is not necessary to change the cutting edges.

The above embodiment is a left hand helix edge type which is rotated clockwise. The effect of this end mill can also be obtained when a right hand helix edge type end mill is rotated counterclockwise. The present invention also includes the embodiments listed below.

1. The taper angle between two edges symmetrical to each other along the axis is small at the smaller end of the tool and gradually increases along its length toward the larger end.

2. Each edge curves inward at a constant curvature.

3. The shape of the bottom is round.

The taper of the embodiment corresponding to item 1 is not straight but changes step by step. The side surface of the embodiment corresponding to item 2 has a circular taper. The end cutting edge of the embodiment corresponding to item 3 is round. As described above, the single end mill of the present invention can perform slot cutting and burnishing simultaneously. No extra tools are required. Therefore, the end mill can form rib slots in a short period and in one process.

Since the taper section has a polygonal helix shape, its stiffness is far greater than that of an ordinary tapered end mill. This reduces breakage and ensures stability, resulting in low cost.

In addition, the polygonal edges are twisted in the direction opposite to the tool rotating direction. This ensures smooth burnishing of the tapered inner surface without causing vibration and produces slots which allow molds to be easily separated from cast product. Moreover, slot cutting and burnishing are done simultaneously using only one tool, greatly reducing production cost.

I claim:

1. A method for cutting tapered deep rib slots with a depth at least five times a width of the slot comprising the steps of:

installing a tapered slot end mill for right hand rotation into an end of a spindle of a rotating cutting machine via a chuck, said tapered slot end mill comprising a shank and a tapered section having a hexagonal shape and disposed at the end of said shank, a helical form cutting edge formed at each vertex of said hexagonal shape along the axis of said end mill and wherein said tapered section is tapered to have a smaller diameter at the end of said mill for cutting tapered deep rib slots with a depth of at least five times a slot width, a pair of end cutting edges is formed symmetrically at ends of said cutting edges with a part of said end cutting edge including in said cutting edge, and a pair of peripheral cutting edges respectively is provided adjacent to said end cutting edges via rake angle surfaces and said end mill is characterized in that said helical form cutting edge is formed in a left hand helix and said peripheral cutting edges are formed in a right hand cut;

cutting into a workpiece from a top a depth less than a length of said peripheral cutting edge;

moving said tapered end mill perpendicular to an axis of said cut in said workpiece to form a slot; and repeating the cutting and moving steps until a desired depth for said slot is reached.

2. A method for cutting tapered deep rib slots according to claim 1 wherein the sides of said polygon of said tapered slot end mill are concave.

3. A method for cutting tapered deep rib slots according to claim 1, wherein said helical form cutting edge is formed between a circumscribed circle of the smaller diameter end of said end mill and that of a tapered ending section disposed at the end of said shank.

4. A method for cutting tapered deep rib slots according to claim 1, wherein the rake angle surfaces are formed at the smaller diameter end.

5. A method for cutting tapered seep rib slots according to claim 1, wherein the length of the peripheral cutting edges is equal to the smaller diameter at the end of said mill.

6. A method for cutting tapered deep rib slots according to claim 1, wherein a release surface of said end cutting edge is formed at the smaller diameter at the end of said mill.

7. A method for cutting tapered deep rib slots with a depth at least five times a width of the slot comprising the steps of:

installing a tapered slot end mill for right hand rotation into an end of a spindle of a rotating cutting machine via a chuck, said tapered slot end mill comprising a shank in a tapered section having a square shape and disposed at the end of said shank, a helical form cutting edge formed at each vertex of said square shape along the axis of said end mill and wherein said tapered section is tapered to have a smaller diameter and the end of said mill for cutting tapered deep rib slots with a depth at least five times a slot width, a pair of cutting edges is formed cemetrically at end of said cutting edges with a part of said end cutting edge included in said helical form cutting edge, and a pair of peripheral cutting edges respectively is provided adjacent to said end cutting edges via rake angle surfaces and said end mill is characterized in that said helical form cutting edge is formed in a left hand helix and said peripheral cutting edges are formed in a right hand cut;

cutting into a workpiece from a top a depth less than a length of said peripheral cutting edge;

moving said tapered end mill perpendicular to an axis of said cut in said workpiece to form a slot; and repeating the cutting and moving steps until a desired depth for said slot is reached.

8. A method according to claim 7, wherein the sides of said square shape of said tapered slot end mill are concave.

9. A method according to claim 7, wherein the helical form cutting edge is formed between a circumscribed circle of the smaller diameter at the end of said mill and that of a tapered end section disclosed at the end of said shank.

10. A method according to claim 7, wherein the rake angle surfaces are formed at the smaller diameter end of said mill.

11. A method according to claim 7, wherein a length of the peripheral cutting edges is equal to the smaller diameter at the end of said mill.

12. A method according to claim 7, wherein a release surface of the end cutting edge is provided at the smaller diameter end of said mill.

* * * * *